United States Patent
Chen et al.

(10) Patent No.: US 9,959,604 B2
(45) Date of Patent: May 1, 2018

(54) DYNAMIC GLOBAL TONE MAPPING WITH INTEGRATED 3D COLOR LOOK-UP TABLE

(71) Applicant: GoPro, Inc., San Mateo, CA (US)

(72) Inventors: Ying Chen, Tianjin (CN); Sumit Chawla, San Carlos, CA (US); Elizabeth Torres Edwards, San Jose, CA (US); Kartheek Chandu, San Mateo, CA (US); Bo Ding, Redwood City, CA (US)

(73) Assignee: GoPro, Inc., San Mateo, CA (US)

( * ) Notice: Subject to any disclaimer, the term of this patent is extended or adjusted under 35 U.S.C. 154(b) by 32 days.

(21) Appl. No.: 15/181,141

(22) Filed: Jun. 13, 2016

(65) Prior Publication Data
US 2017/0358063 A1    Dec. 14, 2017

(51) Int. Cl.
| | | |
|---|---|---|
| *G06T 11/00* | (2006.01) | |
| *G06T 5/00* | (2006.01) | |
| *G06T 5/40* | (2006.01) | |
| *G09G 5/02* | (2006.01) | |
| *G09G 5/06* | (2006.01) | |
| *G09G 5/10* | (2006.01) | |
| *H04N 1/60* | (2006.01) | |
| *H04N 5/374* | (2011.01) | |

(52) U.S. Cl.
CPC ........... *G06T 5/009* (2013.01); *H04N 1/6005* (2013.01); *H04N 1/6008* (2013.01); *H04N 1/6019* (2013.01); *H04N 5/374* (2013.01); *G06T 2207/10024* (2013.01); *G06T 2207/20008* (2013.01); *G06T 2207/20208* (2013.01)

(58) Field of Classification Search
USPC .......................................................... 345/601
See application file for complete search history.

(56) References Cited

U.S. PATENT DOCUMENTS

| | | | | |
|---|---|---|---|---|
| 5,737,032 A * | 4/1998 | Stenzel | ................... | H04N 9/67 348/649 |
| 2006/0034510 A1 * | 2/2006 | Kim | ....................... | H04N 1/644 382/168 |

(Continued)

OTHER PUBLICATIONS

"Multimedia systems and equipment—Colour measurement and management—Part 2-4: Colour management—Extended-gamut YCC colour space for video applications—xvYCC," Consolidated Version, IEC 61966-2-4: Apr. 2006, 86 Pages.

(Continued)

*Primary Examiner* — Wesner Sajous
(74) *Attorney, Agent, or Firm* — Young Basile Hanlon & MacFarlane, P.C.

(57) ABSTRACT

The processing of RGB image data can be optimized by performing optimization operations on the image data when it is converted into the YCbCr color space. First, a raw RGB color space is converted into a YCbCr color space, and raw RGB image data is converted into YCbCr image data using the YCbCr color space. For each Y-layer of the YCbCr image data, a 2D LUT is generated. The YCbCr image data is converted into optimized CbCr image data using the 2D LUTs, and optimized YCbCr image data is generated by blending CbCr image data corresponding to multiple Y-layers. The optimized YCbCr image data is converted into sRGB image data, and a tone curve is applied to the sRGB image data to produce optimized sRGB image data.

20 Claims, 12 Drawing Sheets

(56) References Cited

U.S. PATENT DOCUMENTS

| | | | | |
|---|---|---|---|---|
| 2008/0278423 A1* | 11/2008 | Cheng | ............... | G09G 3/3622 |
| | | | | 345/88 |
| 2009/0034840 A1* | 2/2009 | Umeda | ............... | H04N 1/46 |
| | | | | 382/168 |
| 2011/0149308 A1* | 6/2011 | Hinds | ............... | H04N 1/40012 |
| | | | | 358/1.9 |
| 2013/0322753 A1* | 12/2013 | Lim | ............... | G06T 5/001 |
| | | | | 382/167 |
| 2016/0062716 A1* | 3/2016 | Sasaki | ............... | G06F 3/1287 |
| | | | | 358/1.15 |

OTHER PUBLICATIONS

"Studio encoding parameters of digital television for standard 4:3 and wide-screen 16:9 aspect ratios," Recommendation ITU-R BT.601-7, Mar. 2011, 20 Pages.

"Parameter values for the HDTV standards for production and international programme exchange," Recommendation ITU-R BT.709-6, Jun. 2015, 19 Pages.

Duan, J., et al., "Tone-mapping high dynamic range images by novel histogram adjustment," Pattern Recognition, 2010, pp. 1847-1862, vol. 43.

Goshtasby, A., "Image registration by local approximation methods", Image and Vision Computing, Nov. 1988, pp. 255-261, vol. 6, No. 4, Butterworth & Co. Ltd.

Someya, J., et al., "19.3: Laser TV: Ultra-Wide Gamut for a New Extended Color-Space Standard, xvYCC," SID 06 Digest, 2006, pp. 1134-1137.

\* cited by examiner

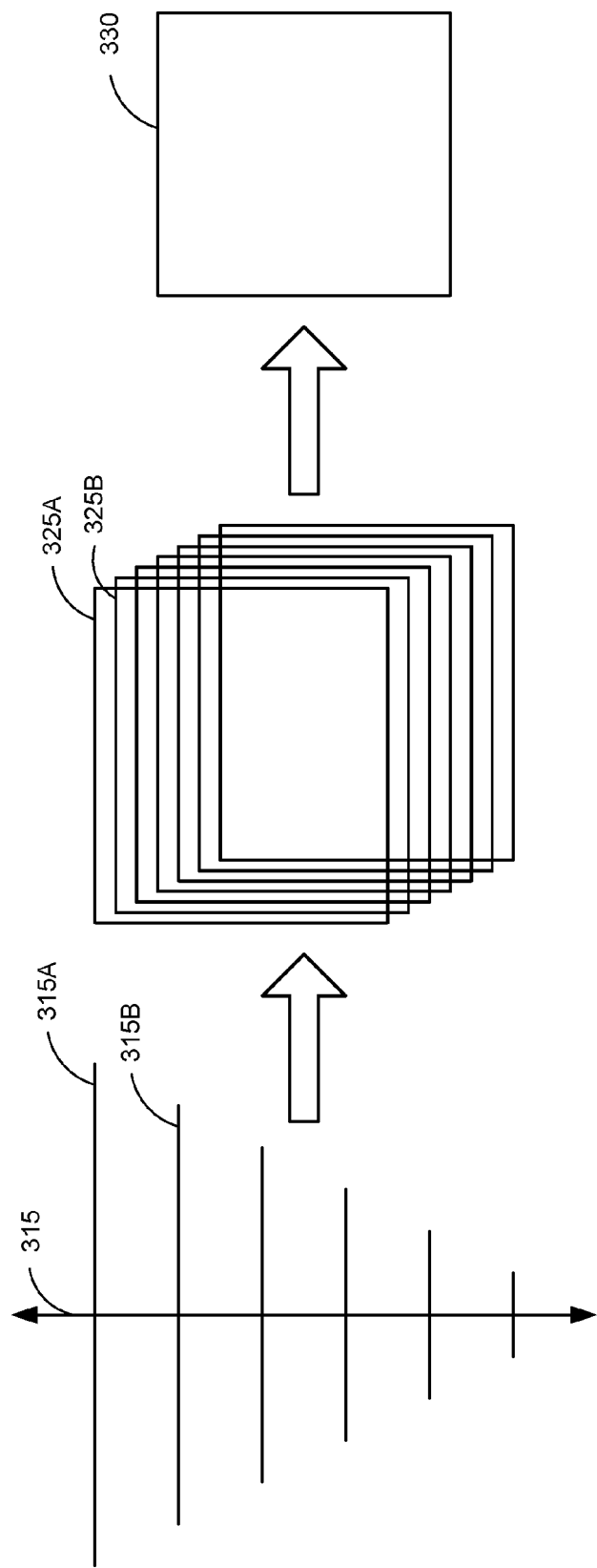

DYNAMIC GLOBAL TONE MAPPING WITH INTEGRATED 3D COLOR LOOK-UP TABLE

BACKGROUND

Field of Art

The disclosure generally relates to the field of digital image and video processing, and more particularly to the implementation of color mapping and tone mapping within a camera architecture.

Description of the Related Art

Digital cameras capture images using an electronic image sensor. Example image sensors use CCD (charge-coupled device) or CMOS (complementary metal-oxide semiconductor) technology. For example, a CMOS image sensor contains photodiodes corresponding to pixels of a captured image. The captured image is presented in a RAW color space associated with the CMOS image sensor. The chroma, hue, and lightness of the captured image can be adjusted using color mapping after the image is captured by the camera. Color mapping maps the RAW color space to a target color space in order to achieve an accurate or preferred color reproduction for captured images. The adjustment to the chroma and hue can result in a less than desirable smoothness for various hues with varying chroma. Conventional color mapping methods adjust the chroma and hue using 3D look-up tables ("LUTs") for chroma, hue, and lightness that are stored on the camera.

In addition to color mapping, tone mapping can play an important role in the capture, storage and reproduction of images because often the bit depth of the image's pixels has a limited dynamic range that is inadequate to capture all of the light intensities present in real-life scenes. Accordingly, tone maps specify which ranges of luminance are mapped to each bit value. General tone maps can be applied to images regardless of the content of the images. For example, tone map bit values may be allocated evenly across the luminance spectrum. However, tone maps can also be adapted based on image content to best represent the real-life scene captured in the image. For example, a scene that is dark or mostly shadowed may use a tone map that allocates more bit values to the darker end of the luminance spectrum than a tone map for an average scene. Similarly, a scene that is particularly bright or light may use a tone map that allocates more bit values to the lighter end of the luminance spectrum than a tone map for an average scene. However, when a scene contains both shadowed and bright features, application of a single tone map may compress features on either edge of the spectrum due to the limited bit depth of the tone map.

Accordingly, the optimization of color and tone mapping in such a way as to minimize undesirable artifacts and improve image quality is an important consideration in the capture of images and the subsequent color and tone rendering of the captured images.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

FIG. 3B illustrates a concept diagram of generating 2D look up tables (LUTs) based on the example color space of FIG. 3A, according to one embodiment.

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Example Camera Configuration

Figure 1:
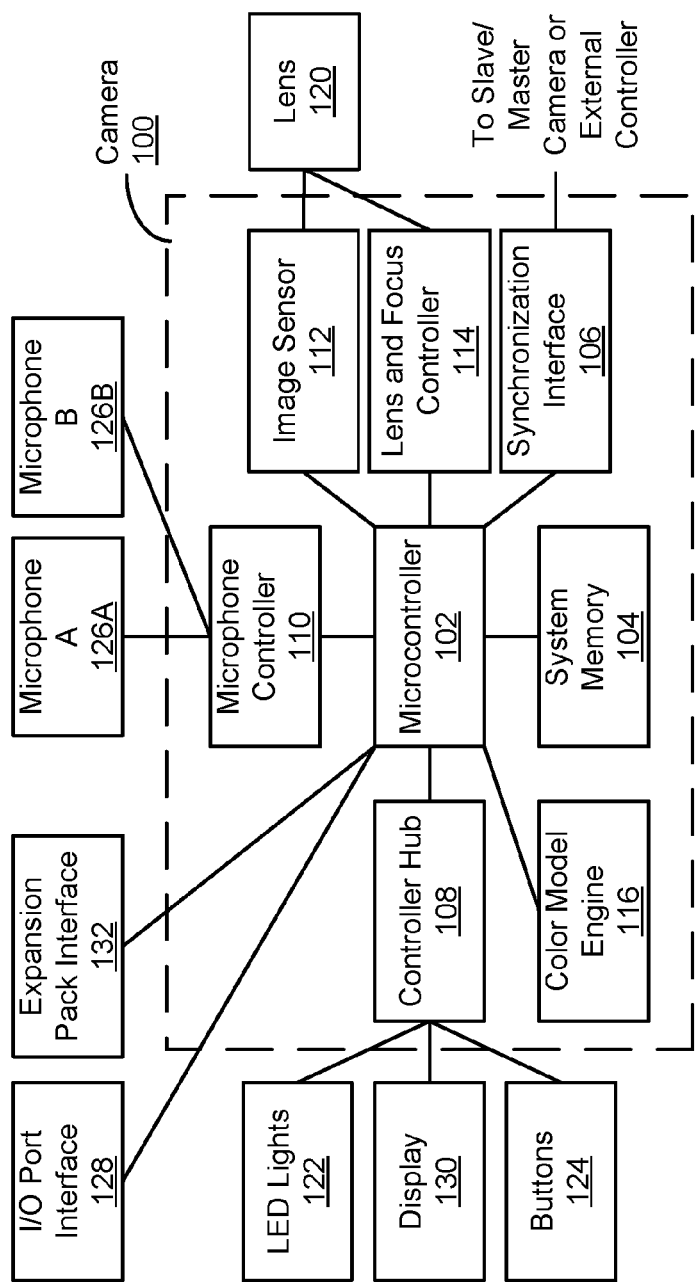
FIG. 1 illustrates an example high-level block diagram of a camera system for implementing color mapping and tone mapping within a digital image, according to one embodiment.

FIG. 1 illustrates an example high-level block diagram of a camera system 100 for implementing color mapping and tone mapping within a digital image, according to one embodiment. The camera 100 of the embodiment of FIG. 1 includes one or more microcontrollers 102, a system memory 104, a synchronization interface 106, a controller hub 108, one or more microphone controllers 110, an image sensor 112, a lens and focus controller 114, a color and tone mapping engine 116, one or more lenses 120, one or more LED lights 122, one or more buttons 124, one or more microphones 126, an I/O port interface 128, a display 130, and an expansion pack interface 132.

The camera 100 includes one or more microcontrollers 102 (such as a processor) that control the operation and functionality of the camera 100. For instance, the microcontrollers 102 can execute computer instructions stored on the memory 104 to perform the functionality described herein. It should be noted that although LUT generation, color space conversion, color mapping, and tone mapping are described herein as performed by the camera 100, in practice, the camera 100 can capture image data, can provide the image data to an external system (such as a computer, a mobile phone, or another camera), and the external system can generate a color map and a tone map based on the captured image data.

A lens and focus controller 114 is configured to control the operation, configuration, and focus of the camera lens 120, for instance based on user input or based on analysis of captured image data. The image sensor 112 is a device capable of electronically capturing light incident on the image sensor 112 and converting the captured light to image data. The image sensor 112 can be a CMOS sensor, a CCD sensor, or any other suitable type of image sensor, and can include corresponding transistors, photodiodes, amplifiers, analog-to-digital converters, and power supplies.

A system memory 104 is configured to store executable computer instructions that, when executed by the microcontroller 102, perform the camera functionalities described herein. The system memory 104 also stores images captured using the lens 120 and image sensor 112. The memory 104 can include volatile memory (e.g., random access memory (RAM)), non-volatile memory (e.g., a flash memory), or a combination thereof.

A synchronization interface 106 is configured to communicatively couple the camera 100 with external devices, such as a remote control, another camera (such as a slave camera or master camera), a computer, or a smartphone. The synchronization interface 106 may transfer information through a network, which allows coupled devices, including the camera 100, to exchange data other over local-area or wide-area networks. The network may contain a combination of wired or wireless technology and make use of various connection standards and protocols, such as WiFi, IEEE 1394, Ethernet, 802.11, 4G, or Bluetooth.

A controller hub 108 transmits and receives information from user I/O components. In one embodiment, the controller hub 108 interfaces with the LED lights 122, the display 130, and the buttons 124. However, the controller hub 108 can interface with any conventional user I/O component or components. For example, the controller hub 108 may send information to other user I/O components, such as a speaker.

A microphone controller 110 receives and captures audio signals from one or more microphones, such as microphone 126A and microphone 126B. Although the embodiment of FIG. 1 illustrates two microphones, in practice, the camera can include any number of microphones. The microphone controller 110 is configured to control the operation of the microphones 126. In some embodiments, the microphone controller 110 selects which microphones from which audio data is captured. For instance, for a camera 100 with multiple microphone pairs, the microphone controller 110 selects one microphone of the pair to capture audio data.

The color and tone mapping engine 116 is configured to optimize the captured image data obtained from the image sensor 112 based on the mapping processes described herein. The mapping processes include color mapping, tone mapping, or any combination thereof. Color mapping generates one or more 3D LUTs associated with optimized image data with a preferred color rendering by mapping the captured image data to target color image data. The preferred color rendering describes color reproduction for use in matching colors of captured image data with colors of target image data. The colors of the target image data can be representative of colors of a real-world image perceived by a human (defined in physical device-independent color space), or of colors displayed by various displays or monitors (defined in device-dependent color space). Tone mapping converts the captured image data to tone-mapped image data with a preferred tone (e.g., contrast, brightness) rendering. The preferred tone rendering describes tone reproduction for use in matching the limited (or low) dynamic range of image data captured by the camera 100 with a high dynamic range (HDR) of real-world images, of images perceived by a human, or of images displayed by various displays or monitors. A dynamic range of real-world scene is the difference between the highest luminance level in the scene and the lowest luminance level. In the illustrated embodiment of FIG. 1, the color and tone mapping engine 116 is located within the camera 100. In some embodiments, the color and tone mapping engine 116 is located external to the camera 100 for instance in a post-processing computer system, in a cloud server, and the like. In some embodiments, a separate tone mapping engine is located within the camera 100, or external to the camera 100. The color and tone mapping engine 116 is further explained in FIG. 2.

Additional components connected to the microcontroller 102 include an I/O port interface 128 and an expansion pack interface 132. The I/O port interface 128 may facilitate the camera 100 in receiving or transmitting video or audio information through an I/O port. Examples of I/O ports or interfaces include USB ports, HDMI ports, Ethernet ports, audioports, and the like. Furthermore, embodiments of the I/O port interface 128 may include wireless ports that can accommodate wireless connections. Examples of wireless ports include Bluetooth, Wireless USB, Near Field Communication (NFC), and the like. The expansion pack interface 132 is configured to interface with camera add-ons and removable expansion packs, such as an extra battery module, a wireless module, and the like.

Color Space Configuration

Figure 2:
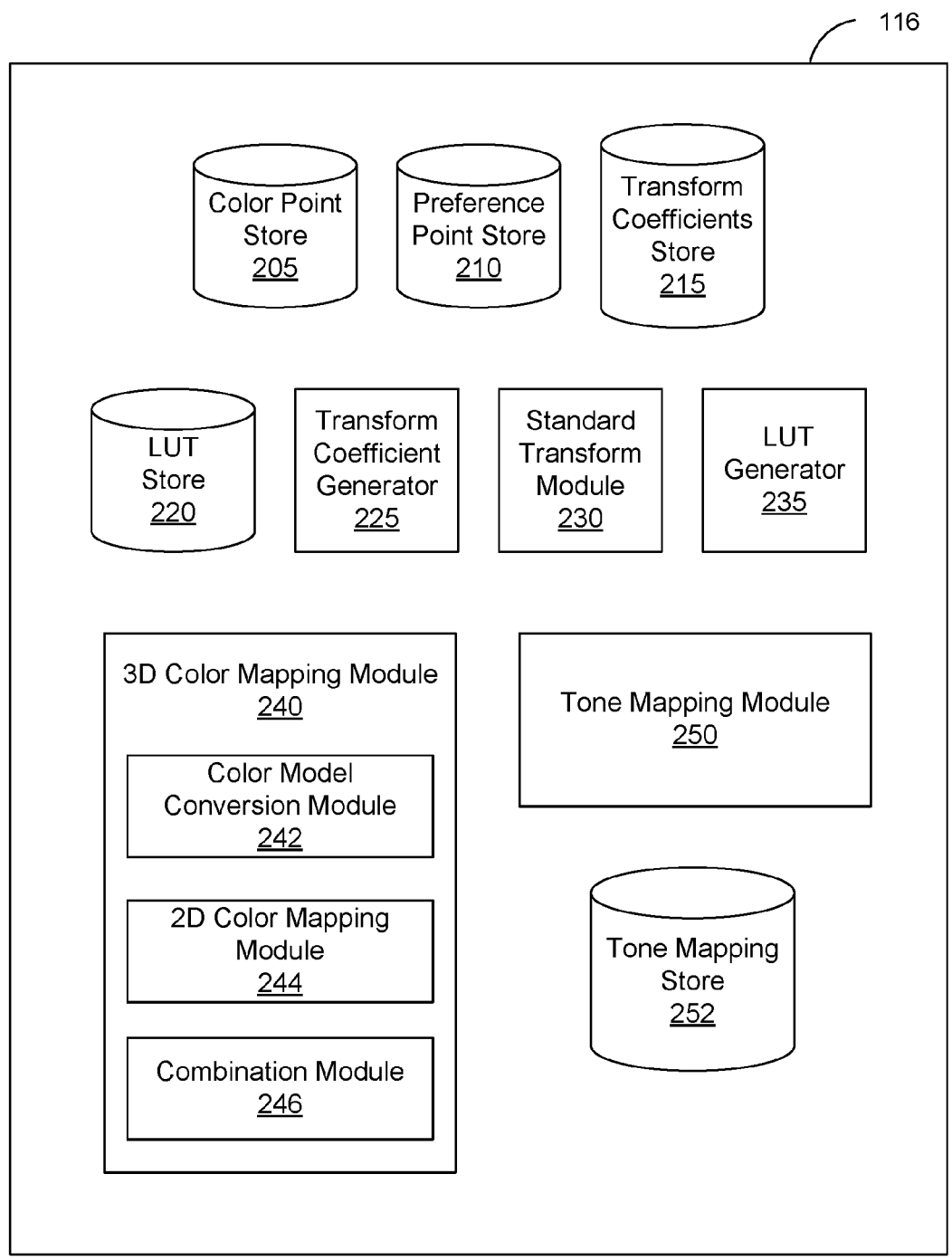
FIG. 2 illustrates an example high-level block diagram of a color and tone mapping engine, according to one embodiment.

FIG. 2 illustrates an example high-level block diagram of the color and tone mapping engine, according to one embodiment. In some embodiments, the color and tone mapping engine 116 is implemented within the system memory 104 of FIG. 1. The color and tone mapping engine 116 includes a color point store 205, a preference point store 210, a transform coefficients store 215, a look up table (LUT) store 220, a transform coefficient generator 225, a standard transform module 230, a LUT generator 235, a 3D color mapping module 240, a tone mapping module 250, and a tone mapping store 252. The color and tone mapping engine 116 can include different and/or additional components than those illustrated in the embodiment of FIG. 2 to perform the functionalities described herein.

The color point store 205 stores color signal information for various color spaces. For instance, the color point store 205 can store color signal information for RGB-type color spaces (e.g., sRGB, Adobe RGB, Adobe Wide Gamut RGB, etc.), CIE defined standard color spaces (e.g., CIE 1931 XYZ, CIELUV, CIELAB, CIEUVW, etc.), Luma plus chroma/chrominance-based color spaces (e.g., YIQ, YUV, YDbDr, YPbPr, YCbCr, xvYCC, LAB, etc.), hue and saturation-based color spaces (e.g., HSV, HSL), CMYK-type color spaces, and any other suitable color space information. In some embodiments, the color point store 205 can store color signal information for a RAW RGB color space and one or more unique color spaces that can be defined by a user.

The stored color signal information for each color space includes one or more dimensions representing color in the color space. For example, the RGB color space has three dimensions representing color: R for red, G for green, and B for blue. For a chroma and hue model, the dimensions include chroma, hue, and lightness. For the YCbCr color space, the dimensions include luma signal (Y), blue-yellow chroma (Cb), and red-green chroma (Cr). The one or more dimensions representing a color in a color space will be referred to collectively as a "point" herein. Each point can be stored in an association with a color in a corresponding color space in the color point store 205.

The standard transform module 230 applies a transform and gamma curve manipulation model to RAW points in image data received from the camera 100. Data captured by image sensors 112 vary for each image sensor 112 on a camera. Thus, the color space of the captured data differs from image sensor to image sensor, and the standard transform module 230 converts the captured data to a standard color space (such as standard RGB). For example, the standard transform module 230 applies a matrix transform to the RAW points and converts them. Conventional transforms include a matrix transform (e.g., 3×3 matrix transforms, matrix multiplication transforms, matrix normalization transforms, and the like), gamma curve manipulation transforms, linear transforms (e.g., CIE XYZ to sRGB, etc.), and any other suitable color space transform from the RAW color space to a standard RGB (sRGB) color space.

The preference point store 210 stores preference information for various points (e.g., the points stored in the color point store 205). Preference information for a point can include predefined tuning information for the point, for example an increase, decrease, or other change in a value associated with one or more dimensions of the point. Preference information can be the same or can differ for one or more points of a color space. Preference information can be based on the color space, and/or can be user-defined or user-selected.

A target color space can be generated based on preference information stored in the preference point store 210 applied to one or more "initial" points in an initial color space such as a standard color space (e.g., sRGB). For example, if preference information describes changes to chroma and hue information for an initial point in an initial color space, the target color space is generated by applying the change to chroma and hue information to the initial point in the initial color space. For each point in the initial color space, an image data relationship or association can be identified between the initial point and a corresponding "target" point in the target color space. The image data relationship can be a linear regression, polynomial regression, or any other suitable data fitting describing the relationship between the initial point of the initial color space and the corresponding target point of the target model.

The transform coefficient generator 225 generates transform coefficients (or simply "coefficients" hereinafter) based on the image data relationships between initial points in the initial color space and target points in the target color space, and stores the generated coefficients in the transform coefficients store 215. For example, in a polynomial fit, the coefficients are parameters defining the polynomial fit. Thus, in general, coefficients are parameters defining image data relationships, such as polynomial fits, between initial points in an initial color space and target points in a target color space. In one embodiment, the initial color space is the standard color space as generated by the standard transform module 230 from RAW points or data in a RAW color space.

The look up table (LUT) generator 235 generates a LUT for each of one or more transforms mapping an initial color space to a target color space based on the relationships between the initial points and corresponding target points for one or more lightness levels. Each generated LUT stores associations between initial points in the initial color space and target points in the target color space based on the transform coefficients and image data relationship associated with the initial points in the initial color space and corresponding target points in the target color space for at least one lightness level. In one embodiment, the LUT stores chroma and hue information in an initial color space, and corresponding chroma and/or hue information in a target color space. Thus, the LUT defines optimized points for the chroma and hue information for each of one or more initial points within the target color space. The LUTs generated by the LUT generator 235 are stored in the LUT store 220. In various embodiments, a plurality of LUTs can be combined by the LUT generator 235 to produce a combined LUT, and the combined LUT can be stored in the LUT store 220. The LUTs can be stored in association with the initial color space, the target color space, or any combination thereof.

The 3D color mapping module 240 generates a 3D LUT associated with an optimized image by mapping an input color space to a target color space based on color space conversion. An input color space is a RAW color space associated with the image sensor 112. For example, the input color space is a RAW RGB color space characterized by the captured image data from the image sensor 112. In some embodiments, the input color space defines digital values of input points, e.g., linear 3D color cube points, color points obtained from a linear RGB image captured by the camera 100. The target color space defines digital values of target points for the color mapping process performed by the 3D color mapping module 240. In some embodiments, the input color digital values (e.g., camera RAW RGB) are based on by physical color charts and light sources. The physical color charts are used for color comparisons and measurements, e.g., for checking the color reproduction of an imaging device. The target color digital values are calculated based on the measurement of lighting spectral power distribution and spectral reflectance of physical color charts. In some embodiments, the input and the target color digital values are calculated based on synthesized spectral reflectance and spectral power distribution of CIE standard light sources. The optimized color space describes a color space having color points (also referred to as optimized points) which are closer to corresponding target points in the target color space than corresponding input points in the input color space.

Color space conversion is used to interconvert the input color space, the target color space, and the optimized color space in a first color space into a corresponding input color space, a corresponding target color space, and a corresponding optimized color space, respectively, in a second color space. The color space describes a specific organization of colors (e.g., a range of colors) for color reproduction. The color space can be the RGB color space, the YCbCr color space, or the Lab color space. For simplicity, the corresponding input color space, the corresponding target color space, and the corresponding optimized color space in the second color space are called an input reference color space, a target reference color space, and an optimized color reference model, respectively. The first color space is different from the second color space. In one embodiment, the first color space is the RGB space. In such embodiments, the corresponding input color space, target color space, and optimized color space are an input RGB color space, a target RGB color space, and an optimized RGB color space, respectively. In some embodiments, the second color space is an YCbCr space. In such embodiments, the corresponding input reference color space, target reference color space, and optimized reference color space are an input YCbCr reference color space, a target YCbCr reference color space, and an optimized YCbCr reference color space, respectively. Color space conversion is further explained below.

The generated 3D LUT can include the input points of the input color space, the input reference points of the input reference color space, the optimized points of the optimized color space, the optimized reference points of the optimized reference color space associations among these sets of points (e.g., conversion coefficients, transform coefficients, data relationship, and dimension associations), or any combination thereof. The generated 3D LUT is stored in the LUT store 220. In some embodiments, color points associated with the color spaces of a 3D color mapping are stored in the color point store 205.

In the embodiment illustrated in FIG. 2, the 3D color mapping module 240 includes a color space conversion module 242, a 2D color mapping module 244, and a combination module 246. Other embodiments of the 3D color mapping module 240 can include different and/or additional modules other than the ones shown in FIG. 2. The 3D color mapping module 240 is further described with reference to the description of FIGS. 6-10.

The Color space conversion interconverts the input color space, the target color space, and the optimized color space in a first color space into a corresponding input color space, a corresponding target color space, and a corresponding optimized color space in a second color space based on corresponding image data relationships. For example, the color space conversion module 242 can convert the input camera RAW RGB color space into the input YCbCr reference color space, can convert the target RGB color space into the target YCbCr reference color space, and can convert the optimized YCbCr reference color space into the optimized RGB color space. In some embodiments, the image data relationships are based on one or more linear associations (e.g., linear fitting, interpolation, or regression analysis), more or more nonlinear associations (e.g., nonlinear fitting, interpolation, or regression analysis), one or more defined transformation matrix based on standards (e.g., ITU-R BT.601, ITU-R BT.709), or any combination thereof. Image data relationships and associations among these image data relationships (e.g., conversion coefficients, transform coefficients, data relationship, and dimension associations) are stored in the LUT store 220. The color space conversion module 242 is further described in FIG. 7.

The 2D color mapping module 244 generates a 2D color LUT associated with 2D optimized points based on mapping the input reference color space to the target reference color space for one or more values from a particular color dimension. In one embodiment, both the input and target reference color spaces have three color dimensions. The 2D color LUT is generated based on two color dimensions from the input and target reference color space with respect to the third color dimension of the input and target reference color space. For example, given an input YCbCr reference color space and a target YCbCr reference color space, the 2D color LUT is obtained by mapping the color points associated with CbCr dimensions of the YCbCr reference color space to the corresponding points associated with CbCr dimensions of the target YCbCr reference color space for one or more values of the Y layer from the input and target YCbCr reference color space. Mapping the input reference color space to the target reference color space is determined by one or more transformation matrix defined by the relationship between the input and target YCbCr reference color space, one or more dimension associations (e.g., chroma ratio or hue difference) between the input and target YCbCr reference color spaces, or any combination thereof. Corresponding examples are described in conjunction with FIG. 6 and FIG. 9.

The combination module 246 generates a 3D color LUT associated with an optimized image by blending the 2D LUTs associated with the particular color dimension from the input and target reference color space. The 3D color LUT is generated based on the 2D LUTs associated with each value of the particular color dimension. For example, the 3D color LUT is generated based on a 2D color LUT based on CbCr dimensions for each value of the Y layer. Thus, the 3D color LUT is representative of the 2D color LUT corresponding to each Y layer. An optimized image is generated by blending the 2D LUTs with CbCr dimensions corresponding to multiple levels of a Y layer in the 3D color LUT. To generate the optimized image of a threshold quality, a threshold number of 2D LUTs can be blended. The combination module 246 is further described in FIG. 10.

The tone mapping module 250 converts input image data to a tone-mapped image by applying a tone map of a particular bit depth to the input image data. In some embodiments, the input image data is the image data captured by the image sensor 112. In other embodiments, the input image data is obtained from the 3D color LUT, e.g., color-mapped image, optimized data from the 3D color LUT, luma signal intensities associated with the color-mapped image data, or any other data associated with the 3D color LUT. To select the tone map that best reflects and preserves content in the input image data, the tone mapping module 250 analyzes the input image data and computes a tone curve (e.g., a gain curve) that describes a relationship between luma signal values and bit values of the input image data. The tone curve is used to generate a tone map that assigns luma signal ranges or values to bit values (a "bit assignment scheme" associated with the tone map, as used herein) globally (also referred to as a global tone mapping) or locally (also referred to as a local tone mapping). A global tone map maps the luminance of every pixel in the input mage data using a global set of bit values. A local tone map, in contrast, maps the luminance of different pixels in the input image data to different sets of bit values based on, for instance, local features of the image data. The tone-mapped image, the corresponding tone map and tone curve, and any associated analysis results can be stored in the tone mapping store 252 for future use. In some embodiments, the bit assignment scheme is stored in association with the tone mapped image.

Figure 10:
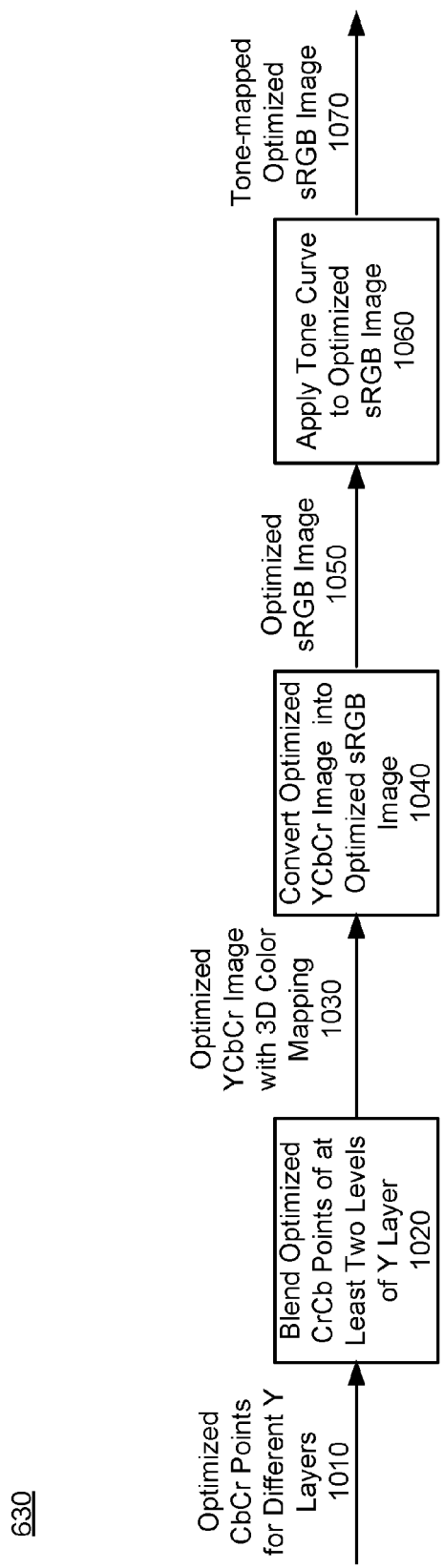
FIG. 10 illustrates a process for generating an optimized sRGB image from blending optimized CbCr points of different Y layers, according to one embodiment.

In some embodiments, a tone map can be applied to an image before a color map, while in other embodiments, the tone map can be applied after the color mapping (as described in conjunction with FIG. 10). In some embodiments, the tone mapping is integrated with the color mapping to obtain an image with preferred color and tone mapping in one step (as described in conjunction with FIG. 11). For example, a tone curve is generated based on the input image data associated with 3D color LUT. In such case, the tone curve changes with luminance intensities and scene type of the input image. Such tone curve is called a dynamic tone curve. The tone mapping for generating a dynamic tone curve is called a dynamic tone mapping. By integrating the dynamic tone mapping and color mapping, a toned, colored-mapped image is generated. The example is further described in conjunction with FIG. 11.

In some embodiments, the tone mapping module 250 also includes a gamma correction module (not shown in FIG. 2). The gamma correction module is used to encode or decode the input image data based on a nonlinear model (e.g., a gamma function) associated with a corresponding encoding or decoding gamma parameter. Typically, a gamma value that is smaller than 1 is called an "encoding gamma value", and a gamma value that is larger than 1 is called a "decoding gamma value". The gamma correction module determines a gamma curve associated with the gamma function and corresponding gamma parameter based on linearity (or non-linearity) properties of the input image data. For example, if the input image data is linear RGB image data, by applying the gamma function with an encoding gamma value to the linear RGB image data, the resulting output image data becomes nonlinear. The output image data can become linear again after a subsequent application of the gamma function with a decoding gamma value.

Example Color Space

Figure 3A:
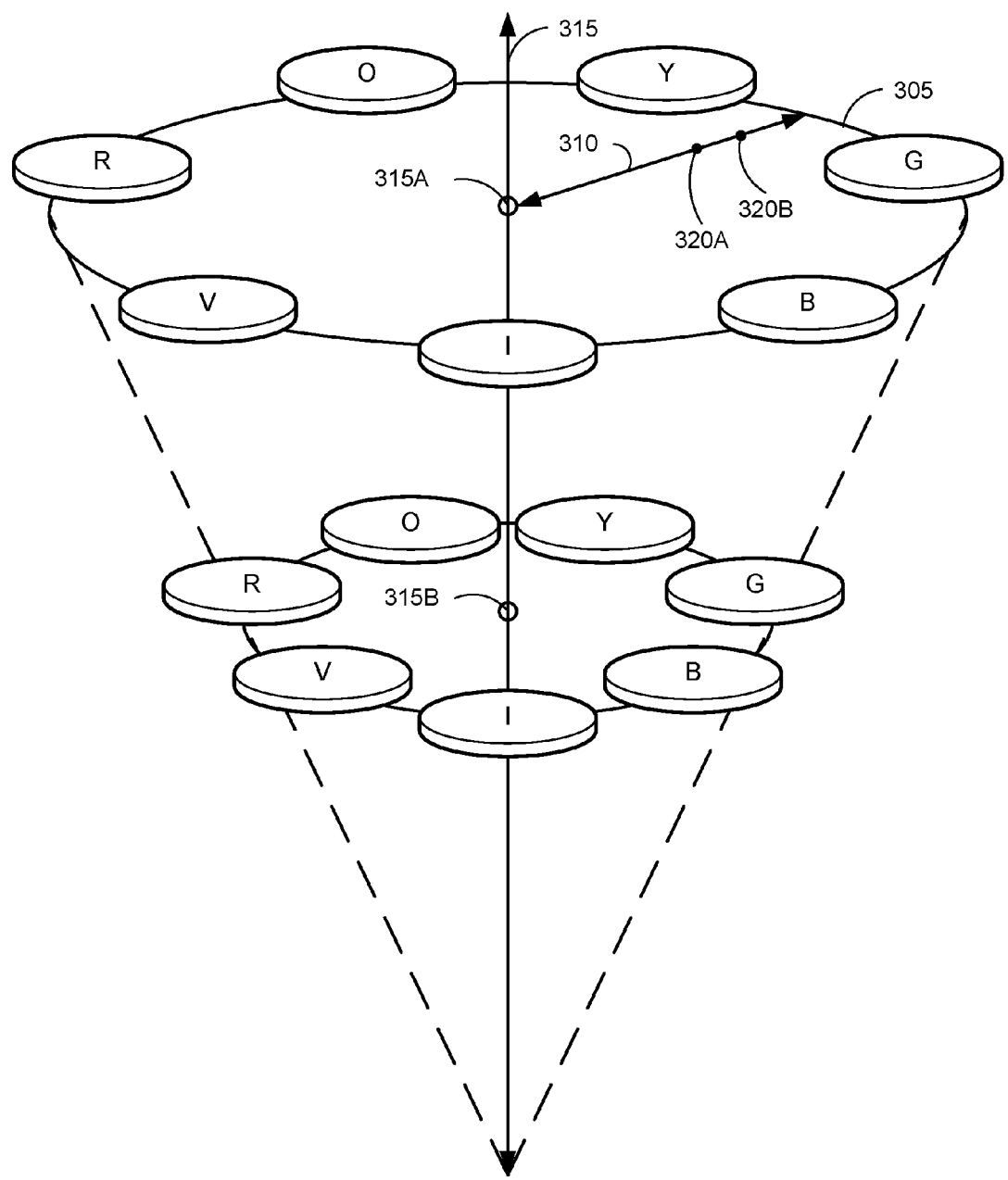
FIG. 3A illustrates an example color space based on chroma, hue, and lightness, according to one embodiment.

FIG. 3A illustrates an example color space 300 based on chroma, hue, and lightness, according to one embodiment. A chroma, hue, and lightness color space is illustrated for the purposes of discussion, but it should be noted that any other suitable color space can be used with the processes described herein. Chroma 310 represents saturation, hue 305 represents color, and lightness 315 represents the lightness of the chroma 310 and hue 305. For varying lightness measures 315A and 315B, various points 320A and 320B representing chroma are determined for corresponding hue levels 305. As shown in FIG. 3A, various lightness in the color space 300 are represented on various z-axis planes of the color space 300, also shown in FIG. 3B. Adjusting a chroma measure from 320A to 320B can be difficult depending on a corresponding hue measure. For example, adjusting chroma 310 for a red hue 305 varies saturation of red more noticeably than adjusting chroma 310 for a green hue 305.

FIG. 3B illustrates the generation of 2D look up tables (LUTs) based on the example color space of FIG. 3A, according to one embodiment. A combined LUT 330 is generated for various LUTs 325, each associated with a lightness level 315. Following the example of a chroma and hue color space 300, LUTs 325A and 325B are generated for lightness levels 315A, 315B. A plurality of the LUTs 325 are combined (e.g., by addition, subtraction, average, or any other suitable processing combination of mappings from points in the initial color space to points in the target color space) to generate one or more combined LUTs 330. For example, LUTs 325A and 325B can be generated for lightness 315A (representative of 100% light) and lightness 315B (representative of 75% light), respectively. A combined LUT 330 can be generated by averaging, for each point in an initial color space, the point of the target color space in LUT 325A and LUT 325B. The combined LUT maps a point in the initial color space to a point in the target color space representative of an average of all points in the target color space mapped to the point in the initial color space by the LUTs 325. The process of generating LUTs 325 for various lightness 315 levels of the chroma and hue color space 300 and combining a plurality of the generated LUTs 325 to generate one or more combined LUTs 330 is further described below in FIGS. 4 and 5.

Figure 4:
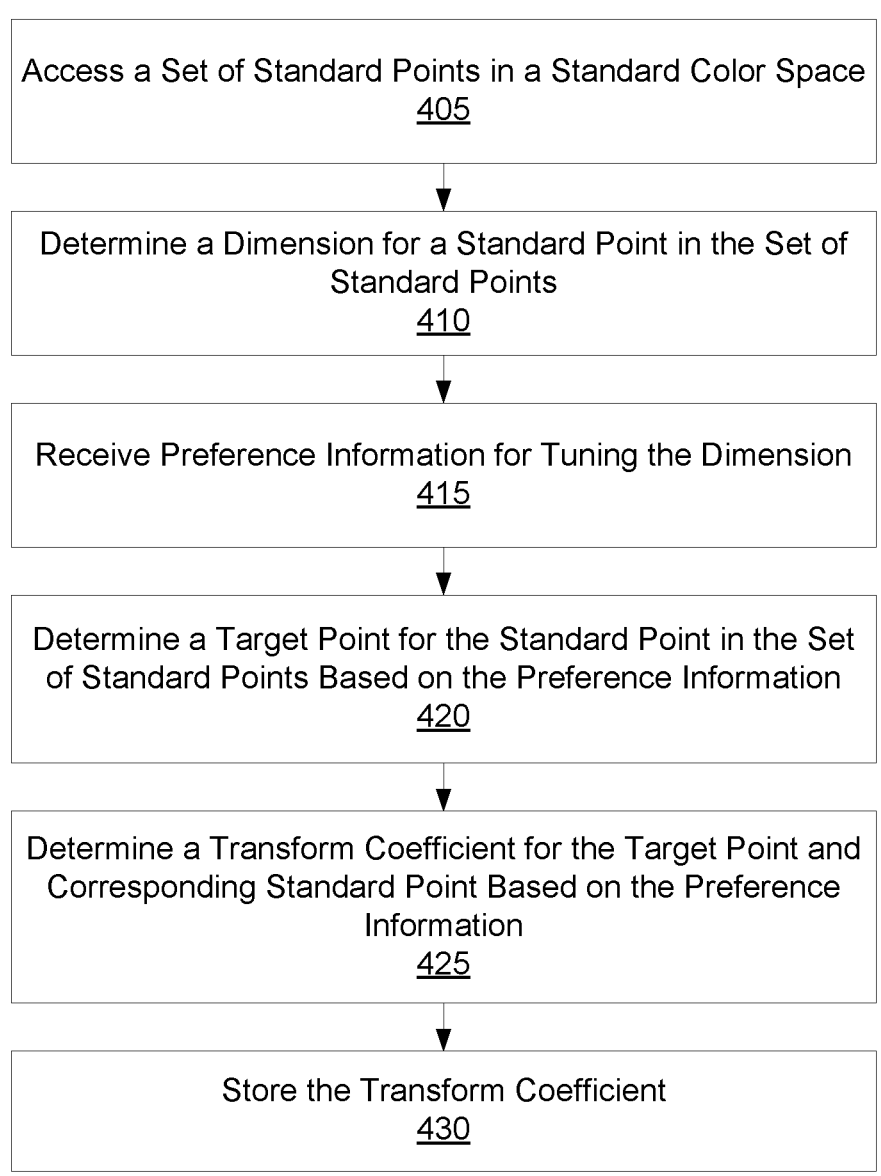
FIG. 4 illustrates a method for determining transform coefficients for a target color space based on a standard color space, according to one embodiment.

Determining Transform Coefficients from a Standard Color Space to a Target Color Space FIG. 4 illustrates a method for determining transform coefficients for a target color space based on a standard color space, according to one embodiment. In other embodiments, the method includes different, additional, or fewer steps than those depicted by FIG. 4. Additionally, in some embodiments, the steps described in conjunction with FIG. 4 may be performed in different orders.

A set of points are accessed 405 within a standard color space and, herein, these points of the standard color space are referred to as "standard points." As described previously in FIG. 2, a point includes color space dimensions (e.g., a point in the RGB color space includes dimensions R, G, B; a point in a chroma hue model includes dimensions chroma, hue, and lightness).

Dimensions of each standard point in the set of standard points are determined 410. If the standard RGB color space is used, then chroma and hue dimensions can be determined based on R, G, and B values associated with the standard points. For example, the R, G, and B values associated with the standard points can be converted to chroma and hue dimensions using RGB to HSV or HSL conversions, conversion charts, or any other suitable conversion method. In alternative methods, the dimensions of each standard point can be the R, G, B values themselves, lightness dimensions, or any other suitable dimension of various color spaces.

Preference information is received 415 for tuning the dimensions of the set of standard points. Preference information for tuning dimensions of a point can be predefined tuning information for the point such as increasing, decreasing, or otherwise altering one or more of the dimensions of the point. Preference information can be dimension-specific. Following the previous example, chroma and hue dimensions can be tuned using preference information specifying how to adjust one or more of the dimensions in the initial color space. Preference information can specify adjustments in, for instance, hue color, chroma, or both hue color and chroma. Preference information can be stored in the preference point store 210.

A target point is determined 420 for each standard point in the set of standard points based on the preference information. The preference information is applied to one or more of the standard points in the set of standard points to determine 420 a corresponding target point in a target color space. For example, the preference information can specify an increase in hue and a decrease in chroma. The determined target point can be stored in the color point store 205 and can be stored in association with the target color space, the standard color space, or any combination thereof.

One or more transform coefficients are determined 425 for each standard point in the set of standard points based on the preference information. Transform coefficients are determined 425 based on a relationship between each target point and a corresponding standard point in the set of standard points. For example, the transform coefficient generator 225 applies a mathematical model to determine a relationship between each target and corresponding standard point, and the transform coefficients are coefficients representative of the mathematical model. The transform coefficients are stored 430, for example, in the transform coefficients store 215. The transform coefficients can also be stored in association with the associated mathematical model.

Figure 5:
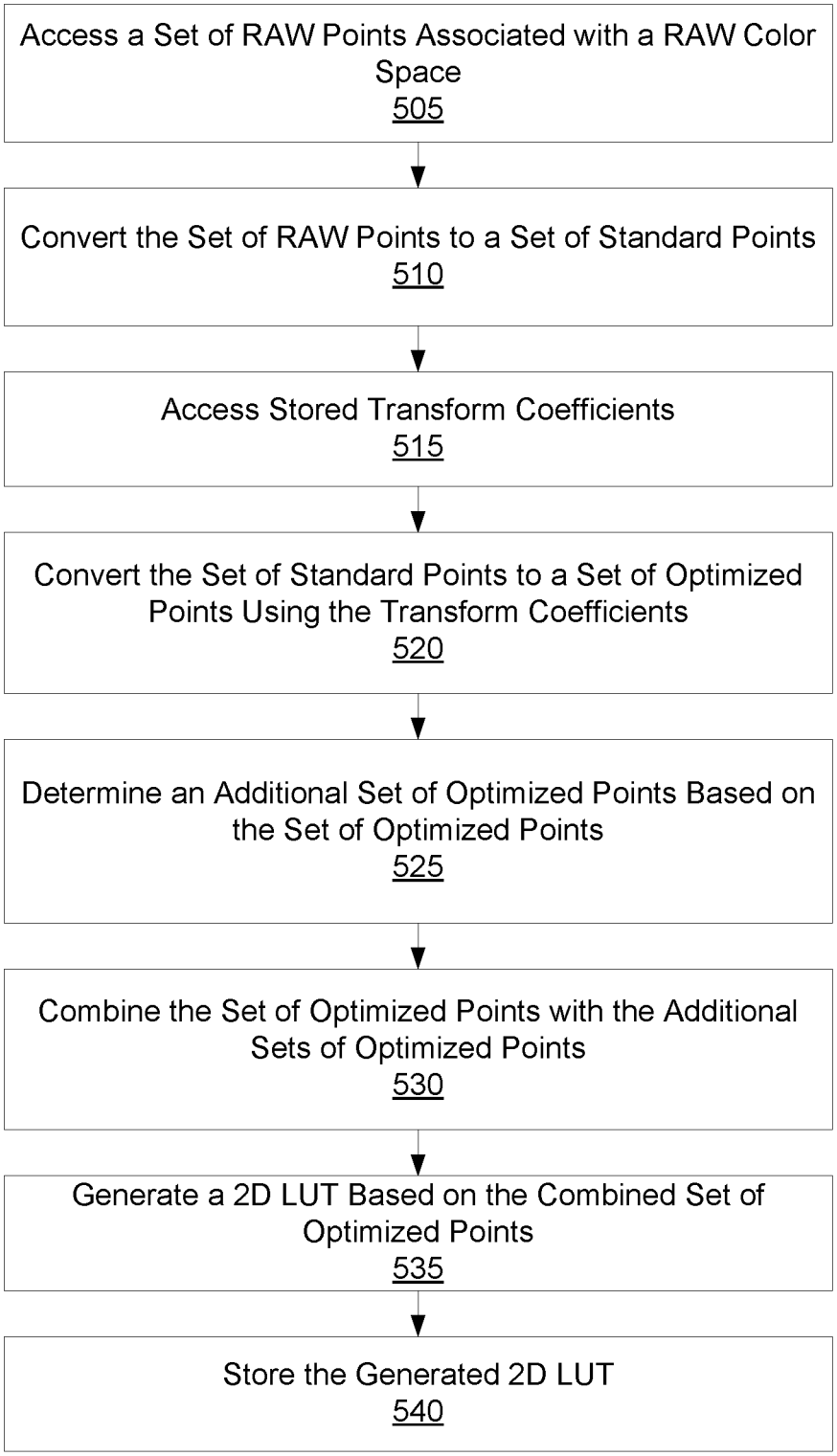
FIG. 5 illustrates a process for converting RAW points to optimized points using transform coefficients, according to one embodiment.

Determining Transform Coefficients from a Standard Color Space to a Target Color Space FIG. 5 illustrates a process for converting RAW points to optimized points using transform coefficients, according to one embodiment. In other embodiments, the method includes different, additional, or fewer steps than those depicted by FIG. 5. Additionally, in some embodiments, the steps described in conjunction with FIG. 5 may be performed in different orders.

A set of RAW points (each RAW point comprising a point in a respective RAW color space) are accessed 505. For example, the RAW points are RGB points within an image from the camera 100. The RAW points can be stored in the color point store 205 in association with the respective RAW color space.

The set of RAW points are converted 510 to a set of standard points. The standard points are points in the standard color space as previously described in FIG. 4. The set of RAW points are converted using, for example, transforms mapping RAW points from the camera in a RAW RGB color space to points in a standard RGB (sRGB) color space.

Stored transform coefficients are accessed 515. The stored transform coefficients are variables of a polynomial fit from the target model to the optimized color space. The set of standard points are converted 520 to a set of optimized points using the transform coefficients in a corresponding mathematical model such as a polynomial fit. Thus, the coefficients are parameters of the polynomial fit. As a result of the conversion, corresponding optimized points are determined. The optimized points are stored in the color point store 205, for example, and can be associated with the target color space. In another embodiment, the optimized points can be stored in association with an optimized color space.

In an alternative embodiment, the transform coefficients accessed from the transform coefficients store 215 are for points not included in the set of standard points to convert 520. In this embodiment, the mathematical model applied to a point can be weighted based on nearby points associated with the transform coefficients. In one embodiment, the mathematical model is a polynomial fitting defined by:

$$x_a = p_{x0} + p_{x1}x + p_{x2}y + p_{x3}x^2 + p_{x4}xy + p_{x5}y^2$$
$$y_a = p_{y0} + p_{y1}x + p_{y2}y + p_{y3}x^2 + p_{y4}xy + p_{y5}y^2 \quad (1)$$

This and other suitable mathematical models for use in the system described herein are described in more detail in "Image registration by local approximation methods", Image and Vision Computing, Vol. 6, 1988, pp. 255-261, the contents of which are incorporated herein by references in their entirety.

For polynomial coefficients $p_{x0}, p_{x1}, p_{x2}, p_{x3}, p_{x4}, p_{x5}, p_{y0}, p_{y1}, p_{y2}, p_{y3}, p_{y4},$ and $p_{y5}$, where $(x,y)$ is the original points in the warping and $(x_a, y_a)$ is the second order polynomial of each original point, weighted averages of equation (1) for nearby points $(x_1, y_1)$ and $(x_2, y_2)$ can be used to determine $(x_3, y_3)$. For example, if distance between points $(x_1, y_1)$ and $(x_3, y_3)$ is shorter than the distance between points $(x_2, y_2)$ and $(x_3, y_3)$, then the polynomial coefficients associated with points $(x_1, y_1)$ are given a higher weight than the polynomial coefficients associated with points $(x_2, y_2)$. The weight can be proportional to the distance between the points and weighted by the greater distance or any other value. For example, the weighted optimized point $(x_p, y_p)$ can be determined by the following:

$$(x_p, y_p) = \frac{\sum_{i=1}^{N} \{W(R_i) \times (x_{ai}, y_{ai})\}}{\sum_{i=1}^{N} \{W(R_i)\}} \quad (2)$$

In equation 2, $(x_{ai}, y_{ai})$ is the polynomial of each original point based on equation 1, N is the number of standard points that are used for local weighted mean averages of the mathematical equation (e.g., polynomial fits), and these standard points have a weighting function $W(R_i)$ larger than 0. $W(R_i)$ can be determined as:

$$W(R_i) = \begin{cases} W(R_i), & 0 \le R \le 1 \\ 0, & R > 1 \end{cases} \quad (3)$$

$$R_i = \frac{\sqrt{(x_t - x)^2 + (y_t - y)^2}}{R_M}$$

In equation 3, $(x,y)$ is a standard point to be converted 520, $(x_t, y_t)$ is a standard point, M is the number of neighboring points of $(x,y)$, and $R_M$ is the distance of $(x,y)$ from its Mth nearest original points. For example, $W(R_i)$ is a monotonically decreasing continuous function of $R_i$, which can be user-defined.

An additional set of optimized points are determined 525 based on the set of optimized points. For example, the additional set of optimized points is determined 525 based on weighted averages of nearby points from the set of optimized points. A similar weighting of mathematical models applied to nearby points can be used to determine the additional set of optimized points.

The set of optimized points are combined 530 with the additional sets of optimized points and a LUT is generated 535 storing association of points in the set of standard points to corresponding points in the set of optimized points and additional set of optimized points. In one embodiment, the generated LUT corresponds to a lightness level of the color space 300. The generated LUT is stored 540. For example, the generated LUT is stored 540 in the LUT store 220.

The generated LUTs stored 540 in the LUT store 220 can be combined as described above to generate one or more combined LUTs that represent various lightness levels. For example, a first generated LUT can be for 100% lightness and a second generated LUT can be for 50% lightness. These two LUTs can be combined to generate a combined LUT. The two LUTs can be combined by adding, subtracting, normalizing, weighting each LUT, or any combination thereof and stored in the LUT store 220. The combined LUT can then be applied, or can be stored for subsequent use.

Generating and Implementing Color Mapping and Tuning Based on a Target Model

Figure 6:
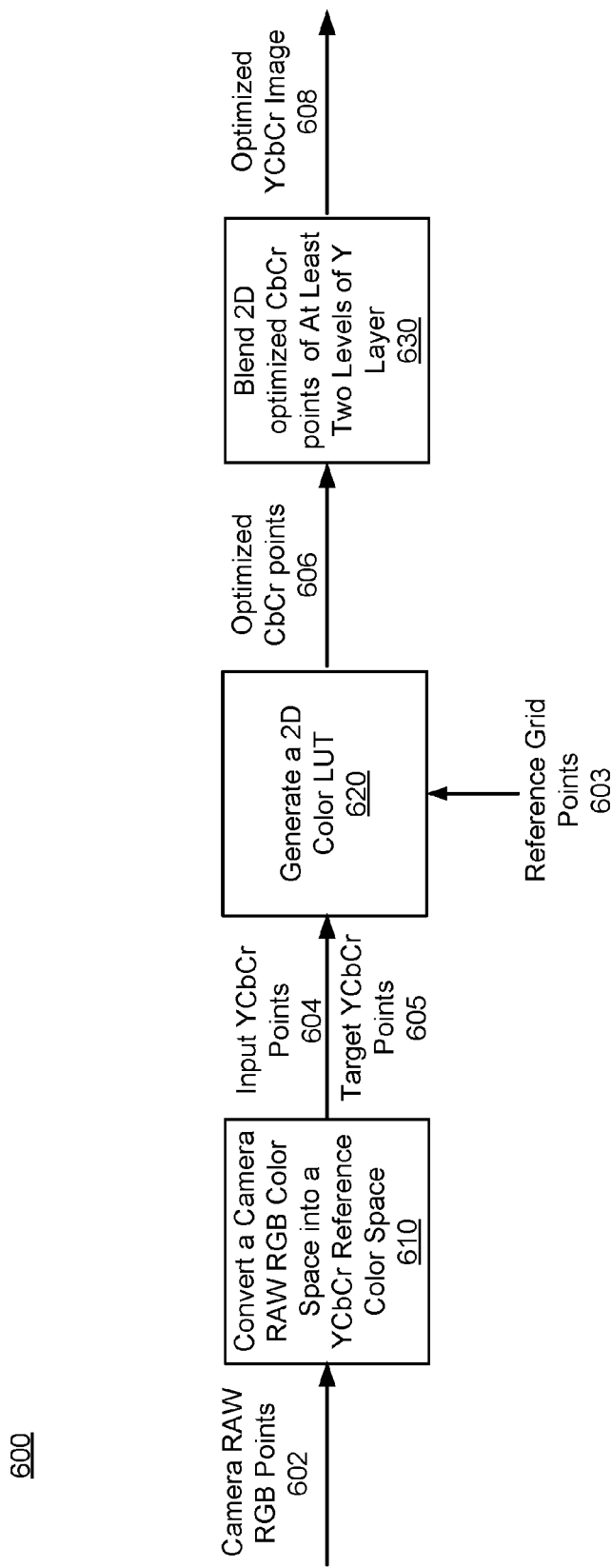
FIG. 6 illustrates a process for 3D color mapping an image, according to one embodiment.

FIG. 6 illustrates a process 600 for 3D color mapping an image, according to one embodiment. The process 600 can be implemented by the 3D color mapping module 240. In other embodiments, the process includes different, additional, or fewer steps than those depicted by FIG. 6. Additionally, in some embodiments, the steps described in conjunction with FIG. 6 may be performed in different orders.

The 3D color mapping module 240 converts 610 a RAW RGB color space received from a camera ("camera RAW RGB color space") into an YCbCr reference color space. For example, the 3D color mapping module 240 accesses the color point store 205 for obtaining a set of camera RAW RGB color space points 602 ("camera RAW RGB points"). The 3D color mapping module 240 converts 610 the RAW RGB points 602 associated with the RAW RGB color space into corresponding YCbCr points 604 associated with the YCbCr reference color space based on a relationship between corresponding color spaces In some embodiments, the 3D color mapping module 240 converts target points associated with a target RGB color space corresponding to the camera RAW RGB color points 602 into corresponding target YCbCr points 605 associated with a target YCbCr reference color space. The color space conversion is further explained in conjunction with FIG. 7.

The 3D color mapping module 240 generates 620 a 2D color LUT associated with a 2D optimized CbCr points 606 by mapping the input YCbCr points 604 associated with the input YCbCr reference color space to the target YCbCr points 605 associated with the target YCbCr reference color space for different levels of the Y layer of the YCbCr color space from the input YCbCr reference color space and target YCbCr reference color space. In some embodiments, the optimized CbCr points 606 are determined by the reference grid points 603, which describe intermediate points for converting the input color points (e.g., camera RAW RGB points 602) into optimized points (e.g., optimized CbCr points 606). The reference grid points 603 are evenly distributed in the coordinate system of CbCr, as further described in FIG. 8. In some embodiments, the optimized CbCr points 606 are determined by a relationship between features (e.g., chroma ratio, hue difference) of the input and target YCbCr reference color space, as further described in FIG. 9.

The 3D color mapping module 240 blends 630 the 2D optimized CrCb points 606 of at least two levels of Y layer to generate an optimized YCbCr image 608 associated with a 3D color LUT. In some embodiments, a tone mapping is applied after the 3D color LUT for obtaining a tone-mapped optimized image, as further explained in FIG. 10.

Figure 7:
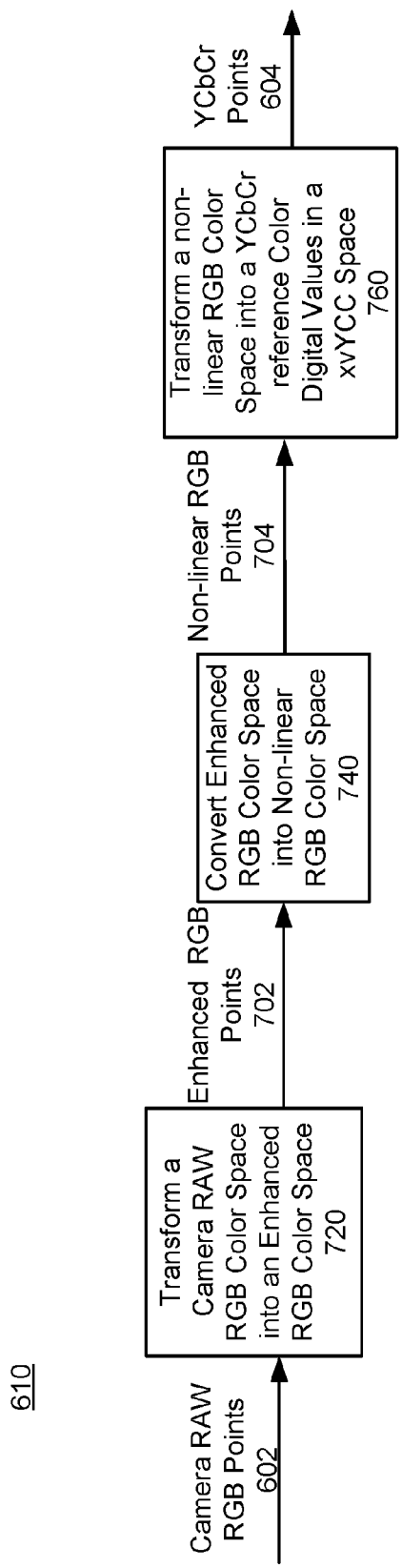
FIG. 7 illustrates a process for converting a camera RAW RGB color space into a YCbCr color space, according to one embodiment.

FIG. 7 illustrates a process 610 for converting a camera RAW RGB color space into an YCbCr reference color space, according to one embodiment. In other embodiments, the process of FIG. 7 includes different, additional, or fewer steps than those depicted by FIG. 7. Additionally, in some embodiments, the steps described in conjunction with FIG. 7 may be performed in different orders.

The color space conversion module 242 transforms 720 the camera RAW RGB color space 602 into an enhanced RGB color space 702 using a linear transformation. All the color points of the RAW RGB color space 602 with values higher than 1 or lower than 0 are thus retained in the enhanced RGB color points 702 without clipping after performing the linear transformation. In some embodiments, the linear transformation can include a matrix transform (e.g., 3×3 matrix transforms, matrix multiplication transforms, matrix normalization transforms, and the like), gamma curve manipulation transforms, and any other suitable color space transform from the camera RAW color space to an enhanced RGB color space.

The color space conversion module 242 converts 740 the enhanced RGB color space 702 into a non-linear RGB color space 704 using a non-linear conversion. For example, the non-linear conversion can include the conversion expressed by equation (4):

$$\begin{cases} \text{If } R, G, B \le -0.018, & \begin{aligned} R' &= -1.009 \times (-R)^{0.45} + 0.099 \\ G' &= -1.009 \times (-G)^{0.45} + 0.099 \\ B' &= -1.009 \times (-B)^{0.45} + 0.099 \end{aligned} \\ \text{If } -0.018 < R, G, B < 0.018, & \begin{aligned} R' &= 4.5 \times R \\ G' &= 4.5 \times G \\ B' &= 4.5 \times B \end{aligned} \\ \text{If } R, G, B \ge 0.018, & \begin{aligned} R' &= 1.009 \times (R)^{0.45} - 0.099 \\ G' &= 1.009 \times (G)^{0.45} - 0.099 \\ B' &= 1.009 \times (B)^{0.45} - 0.099 \end{aligned} \end{cases} \quad (4)$$

In equation 4, R, G, and B are enhanced RGB points 702 after linear transformation from camera RAW RGB color space; R', G' and B' are non-linear RGB points 704 after conversion using Eq. (4).

The color space conversion module 242 transforms 760 the non-linear RGB color space 704 into an YCbCr reference color space 604 in an xvYCC space using a transformation matrix based on any suitable color space standard (e.g., ITU-R BT.601, ITU-R BT.709). The xvYCC space is described in more detail in "Colour management—Extended-gamut YCC colour space for video applications—xvYCC," IEC 61966-2-4: Multimedia systems and equipment—Colour measurement and management, 2006, the contents of which are incorporated herein in their entirety. For example, the transformation matrix can be the transformation matrix expressed by equations (5)-(6):

$$\begin{bmatrix} Y' \\ Cb' \\ Cr' \end{bmatrix}_{xvYCC} = \begin{bmatrix} m11 & m12 & m13 \\ m21 & m22 & m23 \\ m31 & m32 & m33 \end{bmatrix} \begin{bmatrix} R' \\ G' \\ B' \end{bmatrix} \quad (5)$$

$$\begin{aligned} Y_{xvYCC} &= \text{round}((219 \times Y'_{xvYCC} + 16) \times 2^{n-8}) \\ Cb_{xvYCC} &= \text{round}((224 \times YCb'_{xvYCC} + 128) \times 2^{n-8}) \\ Cr_{xvYCC} &= \text{round}((224 \times YCr'_{xvYCC} + 128) \times 2^{n-8}) \end{aligned} \quad (6)$$

In equations 5 and 6, m11-m33 is a 3×3 transformation matrix used to convert R', G', B' to Y', Cb', Cr' in an xvYCC space and defined in ITU-R BT.601 protocol or the ITU-R BT.709 protocol, both are which are incorporated herein in their entirety. The Y, Cb, Cr values are YCbCr color points 604, which are digital quantization values of YCbCr in the xvYCC space converted by equation 5. The Y, Cb, Cr values have the range from $2^{n-8}$ to $254 \times 2^{n-8}$, wherein n is the bit-depth of signal values, which can be larger than or equal to 8.

Similarly, the target YCbCr points 605 can be generated by equations 4 through 6 by replacing the enhanced RGB color space associated with the camera RAW RGB color space with an enhanced RGB color space associated with the target RGB color space. In some embodiments, the color space conversion module 242 converts an optimized YCbCr reference color space into a corresponding RGB color space using an inverse transformation derived from equations 4 through 6. Thus, the color space conversion module 242 can interconvert any RGB color space into a corresponding YCbCr color space during color mapping.

Figure 8:
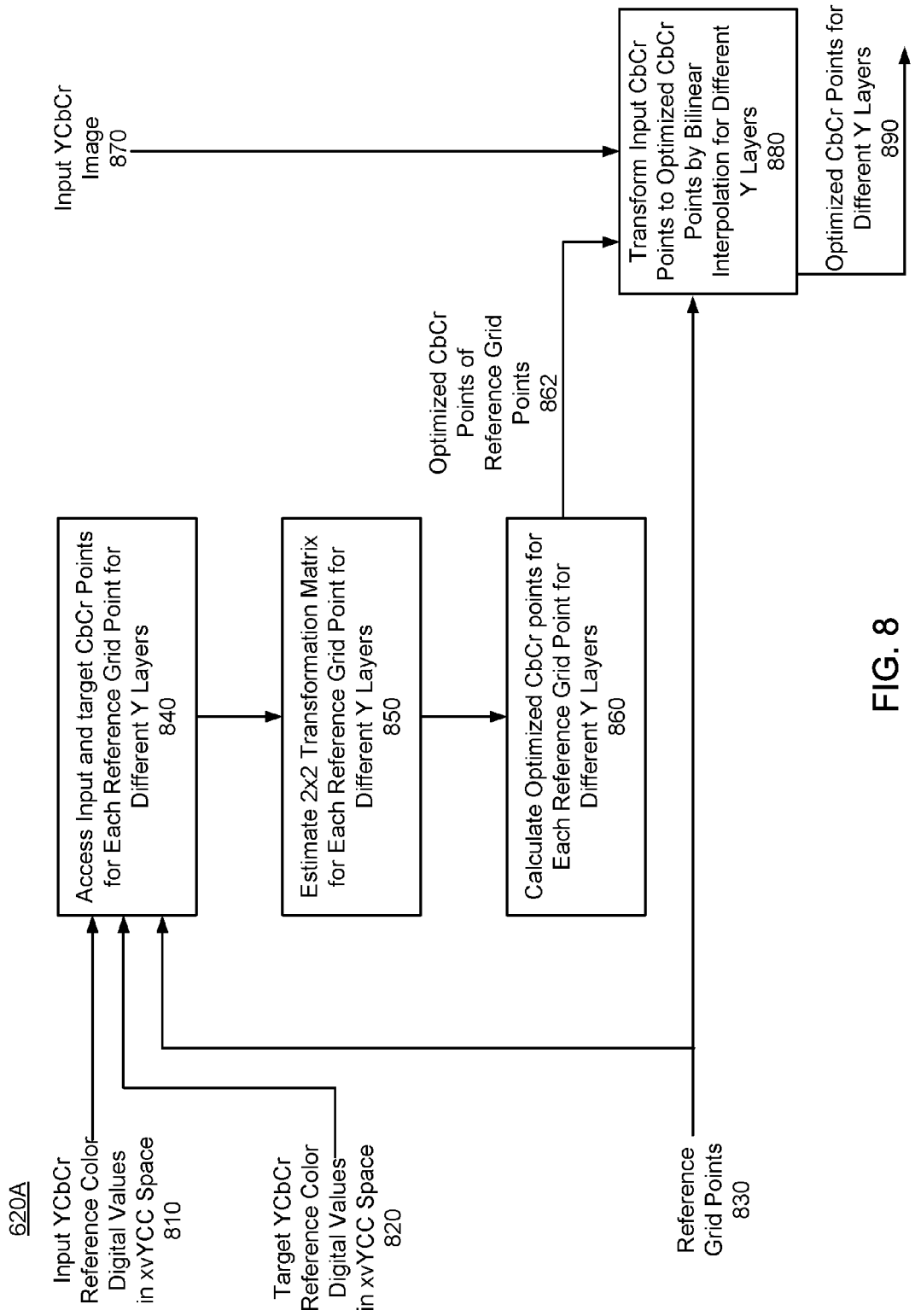
FIG. 8 illustrates a process for generating a 2D color LUT associated with optimized CbCr points based on reference grid points, according to a first embodiment.

FIG. 8 illustrates a process 620A for generating a 2D color LUT associated with optimized CbCr points based on reference grid points 830, according to a first embodiment. In other embodiments, the process includes different, additional, or fewer steps than those depicted by FIG. 8. Additionally, in some embodiments, the steps described in conjunction with FIG. 8 may be performed in different orders.

The 2D color mapping module 244 accesses 840 input and target CbCr points for each reference grid point for different Y layers. In one embodiment, the input CbCr points are obtained from the input YCbCr reference color space 810 corresponding to a value of the Y layer. The target CbCr points are obtained from the target YCbCr reference color space 820 corresponding to the input YCbCr reference color space 810. To find the input and target CbCr points for a particular reference grid point, the input and target CbCr points are selected within a boundary centered around the reference grid point. The size of the boundary is determined by the particular reference grid point located in the center of the small area. To avoid any smoothing issue, the number of reference grid points in CbCr space is equal to or exceeds a threshold value.

The 2D color mapping module 244 estimates 850 a 2×2 transformation matrix for each reference grid point for different Y layers. For example, a 2×2 transformation matrix is estimated based on the coordinates of the input and target CbCr points within a corresponding boundary for one Y layer. The 2×2 transformation matrix for one Y layer can be defined by equation 7:

$$\begin{bmatrix} Cb_{Tgt1} & \ldots & Cb_{TgtN} \\ Cr_{Tgt1} & \ldots & Cr_{TgtN} \end{bmatrix} = \begin{bmatrix} k11 & k12 \\ k21 & k22 \end{bmatrix}_{2\times 2} \times \begin{bmatrix} Cb_{Init1} & \ldots & Cb_{InitN} \\ Cr_{Init1} & \ldots & Cr_{InitN} \end{bmatrix} \quad (7)$$

In the embodiment of equation 7, $Cb_{TgtN}$ and $Cr_{TgtN}$ are the CbCr coordinates of the Nth target CbCr point; $Cb_{InitN}$ and $Cr_{InitN}$ are the CbCr coordinates of the Nth input CbCr point; and $[k_{11}, k_{12}, k_{21}, k_{22}]$ are transform coefficients of the 2×2 transformation matrix.

The 2D color mapping module 244 calculates 860 optimized CbCr points for each reference grid point for different Y layers. For example, the 2×2 transformation matrix is applied to the reference grid point located in the center of a particular small area for determining the optimized CbCr points. The optimized CrCb points for one Y layer can be determined using equation 8:

$$\begin{bmatrix} Cb_{OptM} \\ Cr_{OptM} \end{bmatrix} = \begin{bmatrix} k11 & k12 \\ k21 & k22 \end{bmatrix}_{2\times 2} \times \begin{bmatrix} Cb_{GridM} \\ Cr_{GridM} \end{bmatrix} \quad (8)$$

In the embodiment of equation 8, $Cb_{OptM}$ and $Cr_{OptM}$ are optimized CbCr coordinates of the Mth reference grid point; and $Cb_{GridM}$ and $Cr_{GridM}$ are CbCr coordinates of the Mth reference grid point.

The 2D color mapping module 244 transforms 880 the input CbCr points from the input YCbCr image 870 to corresponding optimized CbCr 890 points based on all of the reference grid points 830 and the corresponding optimized CbCr points 862 using a bilinear interpolation for different Y layers. In one embodiment, the input YCbCr image 870 corresponds to an input YCbCr reference color space in a whole YCbCr color space.

Figure 9:
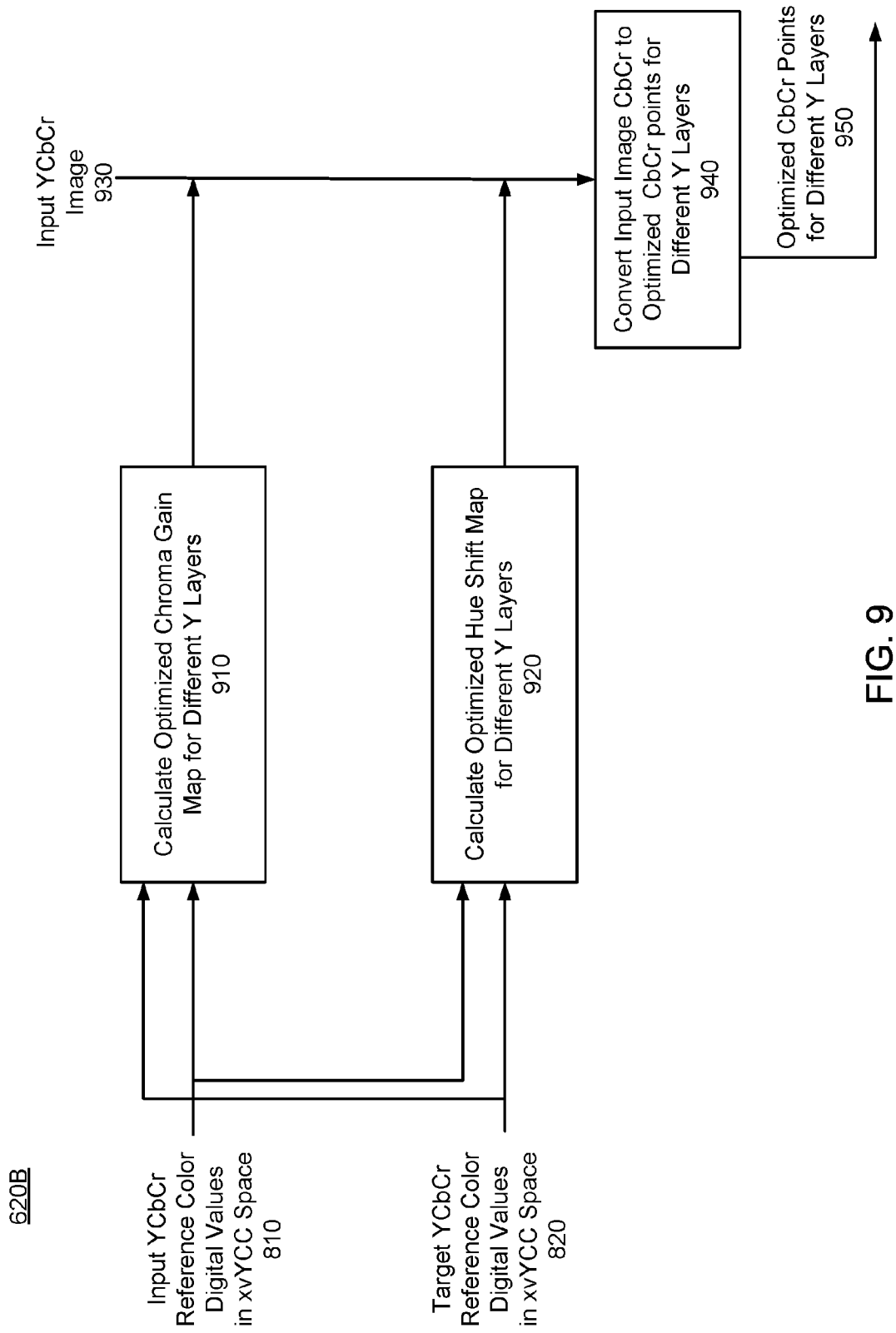
FIG. 9 illustrates a process for generating a 2D color LUT associated with optimized CbCr points based on an optimized chroma gain map and an optimized hue shift map, according to a second embodiment.

FIG. 9 illustrates a process 620B for generating a 2D color LUT associated with optimized CbCr points based on an optimized chroma gain map and an optimized hue shift map, according to a second embodiment. In other embodiments, the process includes different, additional, or fewer steps than those depicted by FIG. 9. Additionally, in some embodiments, the steps described in conjunction with FIG. 9 may be performed in different orders.

The 2D color mapping module 244 calculates 910 an optimized chroma gain map based on the chroma ratio of the input YCbCr reference color space 810 and the target YCbCr reference color space 820 for different Y layers. For example, for each chroma level, the chroma gain of CbCr points are determined by the chroma ratio of the input and target CbCr points for one Y layer. A relationship between the chroma gain and the hue angle of the set of CbCr points is calculated and interpolated using spline interpolation for one Y layer.

The 2D color mapping module 244 calculates 920 an optimized hue shift map based on the hue difference between the input YCbCr color space 810 and the target YCbCr color space 820 for different Y layers. For example, for each chroma level, the hue shifts of CbCr points are determined by the hue difference between the input and target CbCr points. A relationship between the hue shift and hue angle of the set of CbCr points is calculated and interpolated using spline interpolation for one Y layer. With the control of different chroma levels, the low, middle and high chroma colors can be adjusted separately.

The 2D color mapping module 244 converts 940 the input YCbCr image 930 to optimized CbCr points 950 using an optimized chroma gain map and hue shift map for different Y layers. To avoid smoothing issues, the number of sample points at different hue angles and chroma levels can be equal to or exceed a predetermined threshold value.

FIG. 10 illustrates a process 630 for generating an optimized sRGB image from blending optimized CbCr points of different Y layers, according to one embodiment. In other embodiments, the process includes different, additional, or fewer steps than those depicted by FIG. 10. Additionally, in some embodiments, the steps described in conjunction with FIG. 10 may be performed in different orders.

The combination module 246 blends 1020 the optimized CrCb points 1010 of at least two levels of Y layer for generating an optimized YCbCr image 1030 associated with a 3D color LUT. For example, the YCbCr optimized image 1030 is generated by combining the optimized CbCr points at different Y layers. In some embodiments, the combination module 246 converts 1040 the optimized YCbCr image 1030 into a corresponding optimized sRGB image 1050. In one embodiment, the optimized sRGB image can be obtained by applying an inverse transformation derived from equations 4 through 6 to convert the optimized YCbCr image to obtain the corresponding optimized sRGB image.

In some embodiment, the tone mapping module 250 applies 1060 a tone curve to the optimized sRGB image 1050 for generating the tone-mapped optimized sRGB image 1070. For example, the applied tone curve can be a gain curve, and a global tone mapping can be applied to the optimized sRGB image 1050. In such embodiments, applying a global tone mapping to the optimized sRGB image 1050 includes applying the gain curve to each pixel of the optimized sRGB 1050 to get a tone-mapped optimized sRGB 1070.

Dynamic Global Tone Mapping with a 3D Color Look-Up Table

In some embodiments, tone mapping is integrated with the color mapping to obtain an image with preferred color and tone mapping in one computational process. For example, by integrating dynamic tone mapping and color mapping, a toned, colored-mapped image can be generated.

Figure 11:
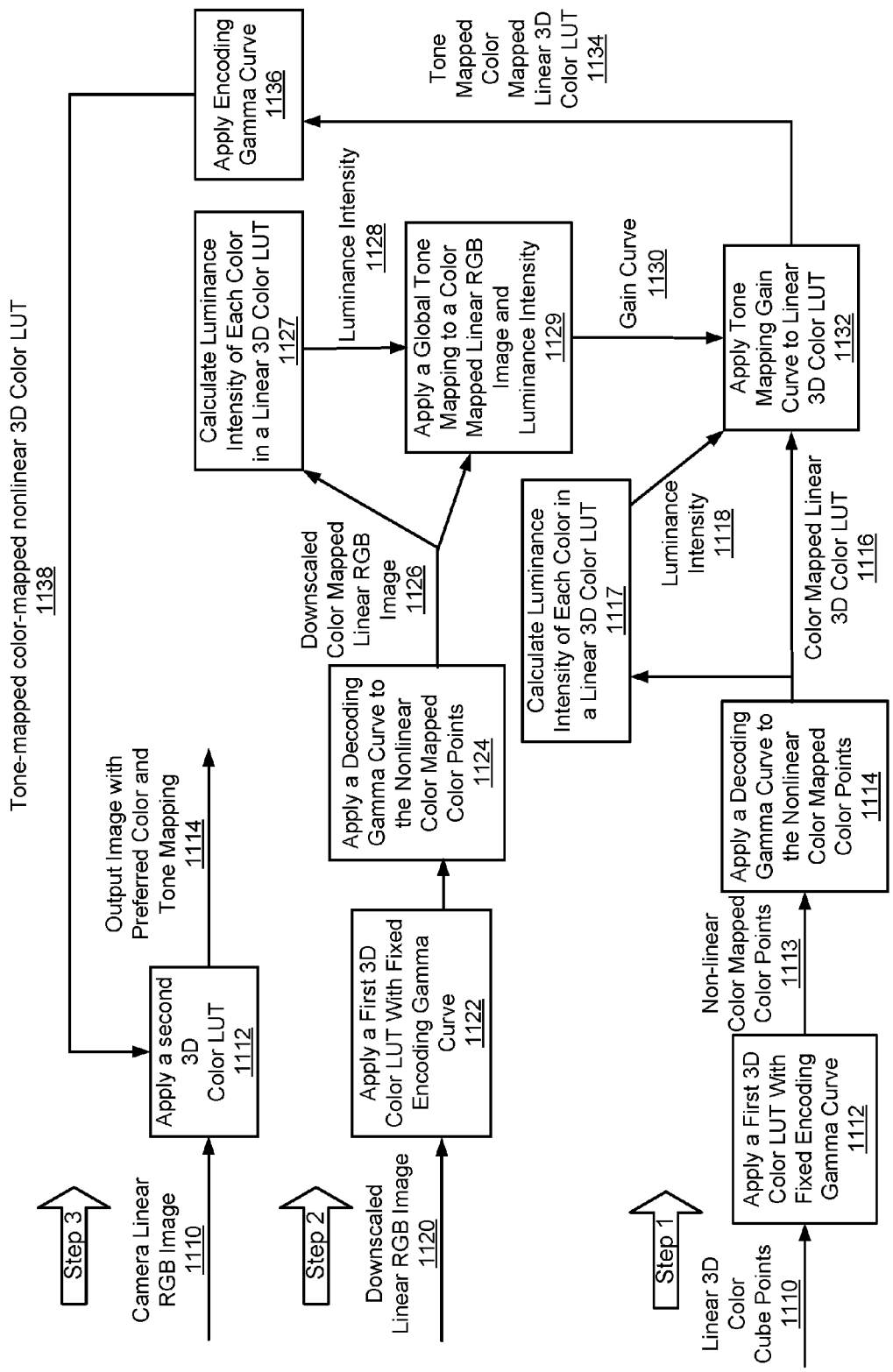
FIG. 11 illustrates a method for integrating dynamic global tone mapping into a 3D color LUT, according to one embodiment.

FIG. 11 illustrates a process for integrating a dynamic global tone mapping into the 3D color LUT, according to one embodiment. The process can be performed by the color and tone mapping engine 116. More particularly, the process can be performed by the combination of 3D color mapping module 240 and tone mapping module 250. In other embodiments, the method includes different, additional, or fewer steps than those depicted by FIG. 11. Additionally, in some embodiments, the steps described in conjunction with FIG. 11 may be performed in different orders. As shown in FIG. 11, the method includes three steps. Each step is described below.

Step 1 builds the mapping between an input color space (e.g., linear 3D color cube points 1110) and a target color space. In one embodiment, the color and tone mapping engine 116 applies 1112 a first 3D color LUT with a fixed gamma curve to linear 3D color cube points 1110 for generating nonlinear color mapped color points 1113. The fixed gamma curve can be pre-generated and accessed upon the determination to combine tone mapping and color mapping. In some embodiments, the first 3D color LUT is extracted from the LUT store 220, the linear 3D color cube points 1110 are extracted from the color point store 205, and the gamma curve is extracted from the tone mapping store 252. Second, the color and tone mapping engine 116 applies 1114 a decoding gamma curve to the nonlinear color mapped color points 1113 to generate a color mapped linear 3D color LUT 1116. Third, the color and tone mapping engine 116 calculates 1117 luminous intensity of each color point in the linear 3D color LUT 1116. For example, the luminous intensity is a weighted function of color mapped linear R, G and B values.

Step 2 generates a dynamic gain curve using a linear 3D color LUT and corresponding luminance intensities. In one embodiment, the color and tone mapping engine 116 uses a camera linear RGB image as an input image. The camera linear RGB image is an image captured using digital camera with high resolution. In some embodiments, as shown in FIG. 11, the camera linear RGB image is downscaled to a low-resolution image 1120 to reduce processing computation. The steps 1122, 1124, are 1127 are similar to the steps 1112, 1114, and 1117, respectively. Instead of using linear 3D color cube points 1110 as an input in Step 1, the downscaled linear RGB image is used as an input for Step 2. After step 1127, the luminous intensity 1128 of each color in the downscaled linear 3D color LUT 1126 is calculated. The color and tone mapping engine applies 1129 a global tone mapping to the color mapped linear RGB image 1126 and to the calculated luminous intensity 1128 to generate a gain curve 1130. The gain curve 1130 corresponds to the captured image associated with the luminance intensities. The gain curve 1130 changes with changes in the luminance intensities and in the scene type of input RGB image; accordingly, the gain curve 1130 can be dynamically updated. The global tone mapping is used to apply the same gain curve to all the pixels in the specific image. In some embodiments, a local tone mapping is used to generate a pixel-wise gain curve by considering pixel neighborhood information for each pixel in the image. The local tone mapping applies the pixel-wise gain curve to each pixel in the image to generate high contrast image.

Step 3 integrates a dynamic tone mapping with a 3D color LUT. In one embodiment, the color and tone mapping engine 116 applies 1132 the tone mapping gain curve 1130 to the color mapped linear 3D Color LUT 1116 based on the calculated luminous intensity of each color in a linear 3D Color LUT 1118 to generate a tone-mapped color-mapped linear 3D Color LUT 1134. The color and tone mapping engine 116 applies 1136 the encoding gamma curve used in step 1112 to the tone-mapped color-mapped linear 3D color LUT 1134 to generate a tone-mapped color-mapped nonlinear 3D color LUT 1138. In one embodiment, the color and tone mapping engine 116 applies the tone-mapped color-mapped nonlinear 3D color LUT 1138 to a camera linear RGB image to generate an output image with preferred color and tone mapping. In another embodiment, the color and tone mapping engine 116 applies a second 3D color LUT to the tone-mapped color mapped nonlinear 3D color LUT to generate a second tone-mapped color-mapped nonlinear 3D color LUT. The color and tone mapping engine 116 applies 1122 the second tone-mapped color-mapped nonlinear 3D color LUT to the camera linear RGB image to obtain an output image with preferred color and tone mapping.

In some embodiments, the first 3D color LUT and the second 3D color LUT are different. For example, the first 3D color LUT is generated by the LUT generator 235 based on the transform coefficients and image data relationship associated with the initial points in the initial color space and corresponding target points in the target color space. The initial and target color space are in the color space, e.g., the sRGB space. Continuing with this example, the second 3D color LUT can be generated by the 3D color mapping module 240 by mapping an input color space to a target color space based on color space conversion. The input color space is obtained from image data captured by the camera 110, e.g., the camera RAW RGB color space. The input color space can be different from the initial color space used to generate the first 3D color LUT. The input and target color spaces in the first color space are converted to corresponding input and target reference color spaces in a second color space. In some embodiments, the first 3D color LUT and the second 3D color LUT can be the same 3D color LUT.

Additional Configuration Considerations

Certain embodiments are described herein as including logic or a number of components, modules, or mechanisms, for example, as illustrated in FIGS. 2 and 3. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or a combination thereof), registers, or other machine components that receive, store, transmit, or display information.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context. Further, unless expressly stated to the contrary, "or" refers to an inclusive or and not to an exclusive or.

Upon reading this disclosure, those of skill in the art will appreciate still additional alternative structural and functional designs for a system and a process for synchronizing multiple image sensors through the disclosed principles herein. Thus, while particular embodiments and applications have been illustrated and described, it is to be understood that the disclosed embodiments are not limited to the precise construction and components disclosed herein. Various apparent modifications, changes and variations may be made in the arrangement, operation and details of the method and apparatus disclosed herein without departing from the spirit and scope defined in the appended claims.

What is claimed is:

1. A camera system, comprising:
an image sensor configured to convert light incident upon the image sensor into raw RGB image data; and
an image signal processor ("ISP") configured to:
access a raw RGB color space corresponding to the raw RGB image data;
convert the raw RGB color space into a YCbCr reference color space;
convert the raw RGB image data into YCbCr image data using the YCbCr reference color space;
generate, for each of a plurality of Y-layers of the YCbCr image data, a 2D color look-up table ("LUT");
convert the YCbCr image data into optimized CbCr image data using the 2D LUTs;
generate optimized YCbCr image data by blending, for at least two Y-layers, the corresponding CbCr image data;
convert the optimized YCbCr image data into tone-mapped optimized sRGB image data; and
store the tone-mapped optimized sRGB image data in a memory of the camera.

2. The camera system of claim 1, wherein converting the raw RGB color space into a YCbCr reference color space comprises:
transforming the raw RGB color space into an enhanced RGB color space using a linear transformation.

3. The camera system of claim 2, wherein converting the raw RGB color space into a YCbCr reference color space further comprises:
converting the enhanced RGB color space into a non-linear RGB color space using a non-linear conversion model.

4. The camera system of claim 3, wherein converting the raw RGB color space into a YCbCr reference color space further comprises:
transforming the non-linear RGB color space into the YCbCr reference color space in a xvYCC color space using a transformation matrix.

5. The camera system of claim 1, wherein generating a 2D color LUT comprises: accessing a set of reference grid points; and
estimating a transformation matrix for each reference grid point for different Y-layers.

6. The camera system of claim 5, wherein converting the YCbCr image data into optimized CbCr image data comprises:
determining optimized CbCr points for each reference grid point for the different P-layers using the estimated transformation matrices; and
transforming the YCbCr image data into optimized CbCr image data using the optimized CbCr points.

7. The camera system of claim 6, wherein transforming the YCbCr image data into optimized CbCr image data using the optimized CbCr points comprises performing bilinear interpolation on the optimized CbCr points for different Y-layers.

8. The camera system of claim 1, wherein generating a 2D color LUT comprises: accessing a target YCbCr color space;
determining an optimized chroma gain map for different Y-layers based on the YCbCr reference color space and the target YCbCr color space; and
determining an optimized hue shift map for different Y-layers.

9. The camera system of claim 8, wherein converting the YCbCr image data into optimized CbCr image data comprises:
converting the YCbCr image data into optimized CbCr image data using the optimized chroma gain maps and the optimized hue shift maps.

10. The camera system of claim 1, wherein converting the optimized YCbCr image data into tone-mapped optimized sRGB image data comprises:
converting the optimized YCbCr image data into sRGB image data; and
applying a tone curve to the sRGB image data to produce tone-mapped optimized sRGB image data.

11. A method, comprising:
converting, by a camera, light incident upon an image sensor of the camera into raw RGB image data;
accessing, by an image signal processor ("ISP") of the camera, a raw RGB color space corresponding to the raw RGB image data;
converting, by the ISP of the camera, the raw RGB color space into a YCbCr reference color space;
converting, by the ISP of the camera, the raw RGB image data into YCbCr image data using the YCbCr reference color space;
generating, by the ISP of the camera, for each of a plurality of Y-layers of the YCbCr image data, a 2D color look-up table ("LUT");
converting, by the ISP of the camera, the YCbCr image data into optimized CbCr image data using the 2D LUTs;
generating, by the ISP of the camera, optimized YCbCr image data by blending, for at least two Y-layers, the corresponding CbCr image data;
converting, by the ISP of the camera, the optimized YCbCr image data into tone-mapped optimized sRGB image data; and
storing, by a memory of the camera, the tone-mapped optimized sRGB image data.

12. The method of claim 11, wherein converting the raw RGB color space into a YCbCr reference color space comprises:
transforming the raw RGB color space into an enhanced RGB color space using a linear transformation.

13. The method of claim 12, wherein converting the raw RGB color space into a YCbCr reference color space further comprises:
converting the enhanced RGB color space into a non-linear RGB color space using a non-linear conversion model.

14. The method of claim 13, wherein converting the raw RGB color space into a YCbCr reference color space further comprises:
transforming the non-linear RGB color space into the YCbCr reference color space in a xvYCC color space using a transformation matrix.

15. The method of claim 11, wherein generating a 2D color LUT comprises: accessing a set of reference grid points; and
estimating a transformation matrix for each reference grid point for different Y-layers.

16. The method of claim 15, wherein converting the YCbCr image data into optimized CbCr image data comprises:
determining optimized CbCr points for each reference grid point for the different P-layers using the estimated transformation matrices; and
transforming the YCbCr image data into optimized CbCr image data using the optimized CbCr points.

17. The method of claim 16, wherein transforming the YCbCr image data into optimized CbCr image data using the optimized CbCr points comprises performing bilinear interpolation on the optimized CbCr points for different Y-layers.

18. The method of claim 11, wherein generating a 2D color LUT comprises: accessing a target YCbCr color space;
determining an optimized chroma gain map for different Y-layers based on the YCbCr reference color space and the target YCbCr color space; and
determining an optimized hue shift map for different Y-layers.

19. The method of claim 18, wherein converting the YCbCr image data into optimized CbCr image data comprises:
converting the YCbCr image data into optimized CbCr image data using the optimized chroma gain maps and the optimized hue shift maps.

20. The method of claim 11, wherein converting the optimized YCbCr image data into tone-mapped optimized sRGB image data comprises:
converting the optimized YCbCr image data into sRGB image data; and
applying a tone curve to the sRGB image data to produce tone-mapped optimized sRGB image data.

* * * * *